United States Patent

[11] 3,633,477

[72] Inventors: Hubert Hackenberg;
Siegfried Zobel, both of Munich; Rainer Spinnler, Oberbiberg; Erwin Becker, Munich; Dieter Engelsmann, Unterhaching, all of Germany
[21] Appl. No. 881,058
[22] Filed Dec. 1, 1969
[45] Patented Jan. 11, 1972
[73] Assignee AGFA-Gevaert Aktiengesellschaft Leverkusen, Germany
[32] Priority Nov. 30, 1968
[33] Germany
[31] P 18 11 908.9

[54] PHOTOGRAPHIC APPARATUS WITH BUILT-IN FLASH UNIT
15 Claims, 1 Drawing Fig.
[52] U.S. Cl.................................................... 95/11, 240/1.3
[51] Int. Cl......................................................G03b 19/02
[50] Field of Search..........................................95/11, 53, 31 AC; 240/1.3

[56] References Cited
UNITED STATES PATENTS
3,319,547  5/1967  Parsons et al................ 240/1.3 X
3,416,424  12/1968  Harvey......................... 95/11 X Primary Examiner—John M. Horan
Assistant Examiner—Thomas A. Mauro
Attorney—Michael S. Striker ABSTRACT: A still camera wherein the shutter is propelled to open position by an impeller which is cocked in response to transport of the film by the length of a frame and is free to leave the cocked position under the action of a spring in response to actuation of the camera release. The camera includes a built-in flash unit having a socket for flashcubes which is indexed by the impeller during movement back to cocked position. A blocking member which automatically arrests the film-transporting mechanism when the film is advanced by the length of a frame is disengaged from the transporting mechanism in response to movement of the impeller from cocked position.

PATENTED JAN 11 1972 3,633,477
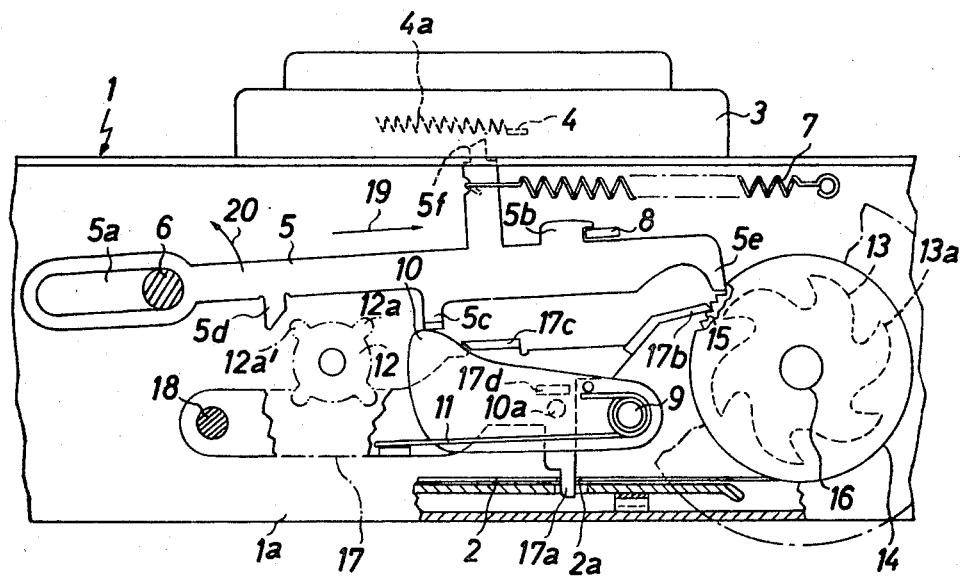
INVENTOR
HUBERT HACKENBERG
SIEGFRIED ZOBEL
BY  RAINER SPINNLER
ERWIN BECKER
DIETER ENGELSMANN

PHOTOGRAPHIC APPARATUS WITH BUILT-IN FLASH UNIT

CROSS-REFERENCE TO RELATED APPLICATION

The photographic apparatus of the present invention constitutes an improvement over and a further development of apparatus disclosed in the copending application Ser. No. 663,140, filed Aug. 24, 1967 by Günther Fauth et al. and assigned to the same assignee.

BACKGROUND OF THE INVENTION

The present invention relates to photographic apparatus in general, especially to still cameras, and more particularly to improvements in photographic apparatus with built-in illuminating arrangements, such as flash units which can utilize flashcubes or analogous multiple flash bulb holders. Still more particularly, the invention relates to improvements in photographic apparatus for use with flashcubes or the like wherein the shutter is moved to open position by an impeller which is cocked by the film transporting mechanism.

The aforementioned copending application Ser. No. 663,140 discloses a photographic apparatus wherein the impeller can complete the circuit of an illuminating arrangement which is connectable to an accessory shoe.

SUMMARY OF THE INVENTION

An object of the invention is to provide a photographic apparatus wherein the impeller is not only capable of actuating the shutter but can additionally perform another important and desirable function, namely, to automatically index the movable part or parts of a built-in illuminating arrangement utilizing flashcubes or analogous multiple flash bulb holders.

Another object of the invention is to provide the photographic apparatus with novel double exposure preventing means which cooperates with the improved impeller and insures that the film transporting mechanism is arrested as soon as an unexposed film frame is advanced into registry with the objective lens.

A further object of the invention is to provide a still camera with built-in illuminating means and with novel and improved means for indexing the movable part or parts of such illuminating means.

The invention is embodied in a photographic apparatus which comprises shutter means including one or more blades movable between a plurality of positions and normally assuming one such position, actuating means preferably including an impeller movable from a cocked to an uncocked position and operative to thereby move the blade or blades from the one position, film transporting means operable to advance the film lengthwise and to thereby move the impeller from uncocked to cocked position, and built-in illuminating means including a socket or an analogous member indexible between a plurality of successive positions. The impeller comprises a driving portion which automatically indexes the socket in response to movement of the impeller from uncocked to cocked position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary horizontal sectional view of a still camera which embodies the invention.

DESCRIPTION OF THE PREFERRED EMBODIMENTS

The drawing illustrates a portion of a still camera which comprises a housing or body 1 supporting a lens mount 3 which accommodates a shutter including a blade 4. A spring 4a biases the blade 4 to the illustrated closed position. The shutter actuating means comprises an impeller 5 having an elongated slot 5a for a fixed pivot pin 6, a first arm 5b which normally engages a depressible camera release 8 and a second arm 5c which is shown in engagement with a motion transmitting lever 10 mounted on a fixed pivot pin 9. A spring 7 biases the impeller 5 toward uncocked position in the direction indicated by arrow 19; when the impeller 5 is free to follow the bias of the spring 7, its arm 5f strikes against the blade 4 and moves it to open position. The arm 5f then bypasses the shutter blade 4 and the latter is free to return to the illustrated closed position under the action of the spring 4a. A further arm or driving portion 5d of the impeller 5 serves to index a socket 12 which can be separably coupled with a multiple flash bulb holder, for example, with a flashcube containing four flash bulbs and a reflector behind each bulb. The socket 12 comprises four equidistant motion receiving projections or lobes 12a which cooperate with the arm 5d during indexing. The impeller 5 further comprises a fifth arm 5e which constitutes a follower and can be engaged by a suitably configurated cam 13 forming part of a transporting mechanism for roll film 2 of the type having a row of equidistant perforations 2a, one for each film frame. The unexposed film is stored in a supply cassette or cartridge (not shown) and is intermittently advanced along a predetermined path extending in front of the rear wall 1a of the housing 1. The film transporting mechanism further comprises a wheel 14 which can be engaged by hand to rotate the cam 13 in a counterclockwise direction, as viewed in the drawing, a shaft 16 which is rigid with the wheel 14 and cam 13 and may constitute the core of a takeup reel, and a toothed member or gear 15 whose teeth preferably resemble ratchet teeth and which is also rigid with the wheel 14 and shaft 16.

The drawing further illustrates a combined scanning and blocking member 17 (hereinafter called blocking member for short) which is pivotable on a fixed pivot pin 18 and includes a tracking portion 17a having a tip which can penetrate into an oncoming perforation 2a during lengthwise transport of the film 2 in response to anticlockwise rotation of the wheel 14. The blocking member 17 further comprises an arresting or blocking portion 17b having a pallet which engages the gear 15 when the tracking portion 17a is free to enter the adjacent perforation 2a whereby the blocking member 17 prevents further transport of the film by holding the film transporting mechanism 13-16 against further anticlockwise rotation.

A torsion spring 11 which is coiled around the pivot member 9 biases the motion transmitting lever 10 in a clockwise direction so that it bears against the arm 5c of the impeller 5. At the same time, the spring 11 biases the blocking member 17 so that a projection 17d of the member 17 bears against and tends to follow a stop post 10a on the lever 10. The blocking member 17 is further provided with a guide portion or rail 17c for the arm 5c.

The drawing illustrates the just described parts in positions they assume when an unexposed film frame is located behind the lens mount 3 and the camera is ready to make an exposure. The spring 7 urges the arm 5b of the impeller 5 against the camera release 8 which dwells in its idle position. The arm 5c of the impeller 5 bears against the motion transmitting lever 10 and stresses the spring 11 which urges the projection 17d of the blocking member 17 toward the stop post 10a. The driving portion or arm 5d is remote from the lobes 12a of the socket 12 and the tracking portion 17a of the blocking member 17 extends into the adjacent perforation 2a; therefore, the arresting portion 17b engages and holds the gear 15 (and hence the entire film transporting mechanism 13-16) against anticlockwise rotation. The shutter blade 4 is held in closed position by the spring 4a.

In order to make an exposure, the user depresses the release 8. This immediately frees the lever 10 to turn on the pin 9 in a clockwise direction so that the impeller 5 is caused to turn on the pin 6 in a counterclockwise direction (arrow 20) and to move its arm 5f into registry with the shutter blade 4. At the same time, the spring 7 begins to contract and propels the arm 5f against the shutter blade 4 which moves to the open position and admits scene light to the unexposed film frame. The extent of movement of the impeller 5 from cocked to uncocked position under the action of the spring 7 is determined by the length of the slot 5a for the pivot pin 6. As the impeller 5 moves under the action of the spring 7, the arm 5f strikes against and thereupon bypasses the shutter blade 4 so that the latter moves to open position and is thereupon free to return to the illustrated closed position under the action of the spring 4a. During such movement of the impeller 5 from cocked position, its arm 5c travels above (i.e., in front of) the rail 17c of the blocking member 17. The arm 5d bypasses the adjacent lobe 12d and thereupon moves into the space between the two upper lobes 12a, as viewed in the drawing. The arm 5e advances toward and comes to rest in front of one of the six teeth on the cam 13.

Since the motion transmitting lever 10 is free to turn in a clockwise direction while the impeller 5 moves in the direction indicated by arrow 19, the spring 11 pivots the blocking member 17 on the pin 18 in a counterclockwise direction and thereby causes withdrawal of tracking portion 17a from the perforation 2a. At the same time, the arresting portion 17b moves away from the gear 15 so that the film transporting mechanism is freed and can be turned by hand through the intermediary of the wheel 14 in order to advance the film 2 lengthwise and to place the next unexposed film frame into registry with the lens mount 3. During such anticlockwise rotation of the film transporting mechanism 13-16, the impeller 5 is pushed back toward uncocked position in directions counter to those indicated by arrows 19 and 20. Such movement of the impeller 5 is effected by the nearest tooth of the cam 13 which engages the follower 5e. During such return movement of the impeller 5, the bent-over edge portion of the arm 5c travels below (i.e., behind) the rail 17c of the blocking member 17 and thereupon engages the motion transmitting lever 10 to pivot the latter in a counterclockwise direction whereby the torsion spring 11 stores energy and pivots the blocking member 17 in a clockwise direction to move the tracking portion 17a into engagement with the advancing film. Thus, the spring 11 biases the tracking portion 17a against the film 2 and causes the tip of such tracking portion to automatically enter the oncoming (next following) perforation 2l7 to thus permit movement of the arresting portion 17b into engagement with the gear 15. This automatically prevents further rotation of the film transporting mechanism at the exact moment when the next unexposed film frame registers with the objective lens. Return movement of the impeller 5 is terminated when its arm 5b is reengaged by the release 8.

During return movement of the impeller 5 toward the illustrated cocked position, its arm 5d engages the adjacent lobe (marked 12a') of the socket 12 and turns the socket through 90° to place a fresh flash bulb into firing position, namely, into a position in which the fresh flash bulb faces the subject. Since the socket 12 is assumed to be intended for use with holders each of which contains four equidistant flash bulbs, the arm 5d is arranged to rotate the socket 12 anticlockwise through 90° in response to each cocking of the impeller 5. When the impeller 5 assumes the illustrated cocked position, the nearest tooth of the cam 13 has advanced beyond its arm 5e so that, when the release 8 is actuated again, the arm 5e can move toward and is ready to be engaged by the next following tooth (marked 13a).

Further modifications of the improved apparatus can be carried out without departing from the spirit of the invention. The cam 13 can be provided with, for example, two or four teeth and each of the parts 10, 17 can be biased by a separate spring. Also, the impeller 5 can be used to actuate a more sophisticated shutter, e.g., an adjustable shutter which can furnish two or more exposure times.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the claims.

What is claimed as new and desired to be protected by Letters Patent is set forth in the appended

1. In a photographic apparatus, a combination comprising shutter means movable between a plurality of positions and normally assuming one of said positions; actuating means movable from a cocked position to an uncocked position and including a first portion operative to move said shutter means from said one position in response to movement of said actuating means from said cocked position; film transporting means operable to advance the film lengthwise and to thereby move said actuating means from said uncocked position to said cocked position; and illuminating means including a built-in member indexible between a plurality of successive positions, said actuating means further comprising a driving portion rigid with said first portion and arranged to index said member of said illuminating means in response to movement of said actuating means from said uncocked position.

2. A combination as defined in claim 1, wherein said actuating means is an impeller and further comprising means for biasing said impeller to said uncocked position.

3. A combination as defined in claim 2, wherein said shutter means comprises blade means and means for biasing said blade means to said one position.

4. A combination as defined in claim 1, wherein said member is indexible about a fixed axis and comprises a plurality of equidistant motion receiving portions one of which extends into the path of said driving portion during movement of said actuating means from said uncocked to said cocked position.

5. A combination as defined in claim 1 for use with roll film of the type having a row of equidistant perforations, one for each film frame, and further comprising blocking means including a tracking portion arranged to engage the film during operation of said transporting means and to enter an oncoming perforation, said blocking means further comprising an arresting portion arranged to arrest said transporting means in response to entry of said tracking portion into such perforation.

6. A combination as defined in claim 5, wherein said film transporting means is rotatable in a predetermined direction to advance the film lengthwise and comprises a toothed member which is engaged by said arresting portion in response to entry of said tracking position into an oncoming perforation.

7. A combination as defined in claim 5, further comprising motion transmitting means operative to urge said tracking portion against the film in response to movement of said actuating means from said uncocked toward said cocked position.

8. A combination as defined in claim 7, wherein said actuating means comprises a portion which bears against said motion transmitting means during movement of said actuating means toward and in said cocked position thereof, said motion transmitting means being pivotable about a fixed axis.

9. A combination as defined in claim 5, further comprising resilient means for biasing said motion transmitting means against said actuating means.

10. A combination as defined in claim 9, further comprising release means movable between a first position in which it maintains said actuating means in said cocked position and a second position in which said actuating means is free to move toward said shutter means under the action of said resilient means and by way of said motion transmitting means.

11. A combination as defined in claim 10, wherein said blocking means is arranged to withdraw said tracking portion from the adjoining perforation in response to movement of said motion transmitting means under the action of said resilient means.

12. A combination as defined in claim 11, wherein said resilient means couples said motion transmitting means with said blocking means.

13. In a photographic apparatus for use with roll film of the type having a row of equidistant perforations, one for each film frame, a combination comprising shutter means movable between a plurality of positions and normally assuming one of said positions; actuating means movable from a cocked position to an uncocked position and operative to thereby move said shutter means from said one position; film transporting means operable to advance the film lengthwise and to thereby move said actuating means to said cocked position; illuminating means including a built-in member indexible between a plurality of successive positions, said actuating means comprising a driving portion arranged to index said member of said illuminating means in response to movement of said actuating means from said uncocked position; and blocking means including a tracking portion arranged to engage the film during operation of said transporting means and to enter an oncoming perforation, said blocking means further comprising an arresting portion arranged to arrest said transporting means in response to entry of said tracking portion into such perforation.

14. A combination as defined in claim 13, wherein said actuating means comprises a second portion arranged to effect the movement of said tracking portion against the film in response to movement of said actuating means from said uncocked position.

15. A combination as defined in claim 13, further comprising release means arranged to normally hold said actuating means in said cocked position and biasing means for urging said actuating means to said uncocked position, said release means being operable to release said actuating means to the action of said biasing means.

* * * * *